United States Patent
Pearson (10) Patent No.: US 9,426,052 B2
(45) Date of Patent: *Aug. 23, 2016

(54) SYSTEM AND METHOD OF MANAGING PUBLICATIONS

(71) Applicant: AT&T INTELLECTUAL PROPERTY I, LP, Atlanta, GA (US)

(72) Inventor: Larry B. Pearson, San Antonio, TX (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/845,445

(22) Filed: Sep. 4, 2015

(65) Prior Publication Data

US 2015/0381464 A1    Dec. 31, 2015

Related U.S. Application Data

(63) Continuation of application No. 11/760,559, filed on Jun. 8, 2007.

(51) Int. Cl.
| | |
|---|---|
| *G06F 15/173* | (2006.01) |
| *H04L 12/26* | (2006.01) |
| *H04L 29/06* | (2006.01) |
| *H04L 12/58* | (2006.01) |
| *G06Q 10/10* | (2012.01) |
| *H04L 29/08* | (2006.01) |

(52) U.S. Cl.
CPC ............ *H04L 43/16* (2013.01); *G06Q 10/10* (2013.01); *H04L 51/12* (2013.01); *H04L 63/126* (2013.01); *H04L 63/1408* (2013.01); *H04L 67/30* (2013.01); *H04L 12/585* (2013.01)

(58) Field of Classification Search
CPC ..... H04L 12/585; H04L 51/12; H04L 63/126; G06Q 10/10
USPC .......................................................... 709/225
See application file for complete search history.

(56) References Cited

U.S. PATENT DOCUMENTS

| | | |
|---|---|---|
| 6,484,197 B1 | 11/2002 | Donohue et al. |
| 6,697,462 B2 | 2/2004 | Raymond et al. |
| 7,617,285 B1 | 11/2009 | Hartmann et al. |
| 7,706,263 B2 | 4/2010 | Zhou et al. |
| 7,716,297 B1 | 5/2010 | Wittel et al. |
| 8,612,359 B2 | 12/2013 | Hull et al. |
| 2002/0059454 A1 | 5/2002 | Barrett et al. |
| 2002/0120705 A1 | 8/2002 | Schiavone et al. |
| 2005/0144238 A1 | 6/2005 | Morin et al. |
| 2005/0171954 A1 | 8/2005 | Hull et al. |
| 2006/0004896 A1 | 1/2006 | Nelson et al. |
| 2006/0026242 A1 | 2/2006 | Kuhlmann et al. |
| 2006/0031464 A1 | 2/2006 | Bowman et al. |

(Continued)

*Primary Examiner* — Joseph E Avellino
*Assistant Examiner* — James Conaway
(74) *Attorney, Agent, or Firm* — Guntin & Gust, PLC; Jay H Anderson (57) ABSTRACT

A system and method of managing publications is disclosed. A system that incorporates teachings of the present disclosure may include, for example, a Address Book System (ABS) having a controller element to adjust publication privileges of a publisher of a portion of an address book stored in the ABS responsive to detecting that a number of recipients of an invitation to subscribe to the portion of the address book have declined the invitation and the number of declined invitations exceeds a first threshold. Additional embodiments are disclosed.

19 Claims, 4 Drawing Sheets

(56) References Cited

U.S. PATENT DOCUMENTS

| | | |
|---|---|---|
| 2006/0037070 A1 | 2/2006 | Davis et al. |
| 2006/0047766 A1 | 3/2006 | Spadea et al. |
| 2006/0047769 A1 | 3/2006 | Davis et al. |
| 2006/0075048 A1 | 4/2006 | Gruper et al. |
| 2006/0123008 A1 | 6/2006 | Stillion et al. |
| 2006/0148496 A1 | 7/2006 | Zhu et al. |
| 2007/0038720 A1 | 2/2007 | Reding et al. |
| 2007/0239639 A1 | 10/2007 | Loughmiller et al. |
| 2008/0140826 A1 * | 6/2008 | McColgan ............ G06Q 10/107 709/224 |
| 2008/0256602 A1 | 10/2008 | Pagan et al. |
| 2010/0226261 A1 | 9/2010 | Piche et al. |
| 2011/0213849 A1 | 9/2011 | Ben-Yoseph et al. |
| 2012/0265834 A1 | 10/2012 | Davis et al. |
| 2013/0067562 A1 | 3/2013 | Davis et al. |

* cited by examiner

SYSTEM AND METHOD OF MANAGING PUBLICATIONS

CROSS-REFERENCE TO RELATED APPLICATIONS

This application is a continuation of U.S. patent application Ser. No. 11/760,559, filed Jun. 8, 2007, which is incorporated herein by reference in its entirety.

FIELD OF THE DISCLOSURE

The present disclosure relates generally to contact information processing, and more specifically to a system and method of managing publications.

BACKGROUND

Some content management systems provide consumers a centralized and convenient means to store contact and calendar information which can be accessible from a multitude of communication devices (e.g., computers, PDAs, cell phones, etc.). Such systems also allow their subscribers to share contact and/or calendar information by subscription with other members of the same system. This feature allows members to create a network of shared information with automatic updates.

Spammers can seek a wide audience in centralized content management system. For example, a spammer can submit invitations to a large population of members to subscribe to an address book and/or calendar of the spammer. The address book can include links to information the spammer wants the subscribed users to see. The calendar information can also be used to publish advertisements or other forms of nuisance information. Spamming activities like this can be undesirable to consumers.

A need therefore arises for a system and method of managing publications.

DETAILED DESCRIPTION

Embodiments in accordance with the present disclosure provide a system and method of managing publications. The present disclosure is related to U.S. patent application Ser. No. 11/345,461, filed Feb. 1, 2006, by Pearson et al., entitled "System and Method of Publishing Contact Information" (now U.S. Pat. No. 8,116,444), which is incorporated herein by reference in its entirety.

In an embodiment of the present disclosure, a computer-readable storage medium can have computer instructions for receiving from a sender one or more requests to publish to a plurality of recipients a portion of a network address book of the sender, submitting to the plurality of recipients an invitation to subscribe to the portion of the network address book, comparing a first threshold to a number of declined invitations received from the plurality of recipients, and adjusting the sender's ability to publish a second portion of the network address book responsive to identifying the sender as a potential spammer when the number of declined invitations exceeds the first threshold.

In another embodiment of the present disclosure, an Address Book System (ABS) can have a controller element to adjust publication privileges of a publisher of a portion of an address book stored in the ABS responsive to detecting that a number of recipients of an invitation to subscribe to the portion of the address book have declined the invitation and the number of declined invitations exceeds a first threshold.

In another embodiment of the present disclosure, a method can involve modifying publication privileges of a sender responsive to a number of recipients declining an invitation to subscribe to a portion of content supplied by the sender, wherein the number of declined invitations exceeds a threshold.

Figure 1:
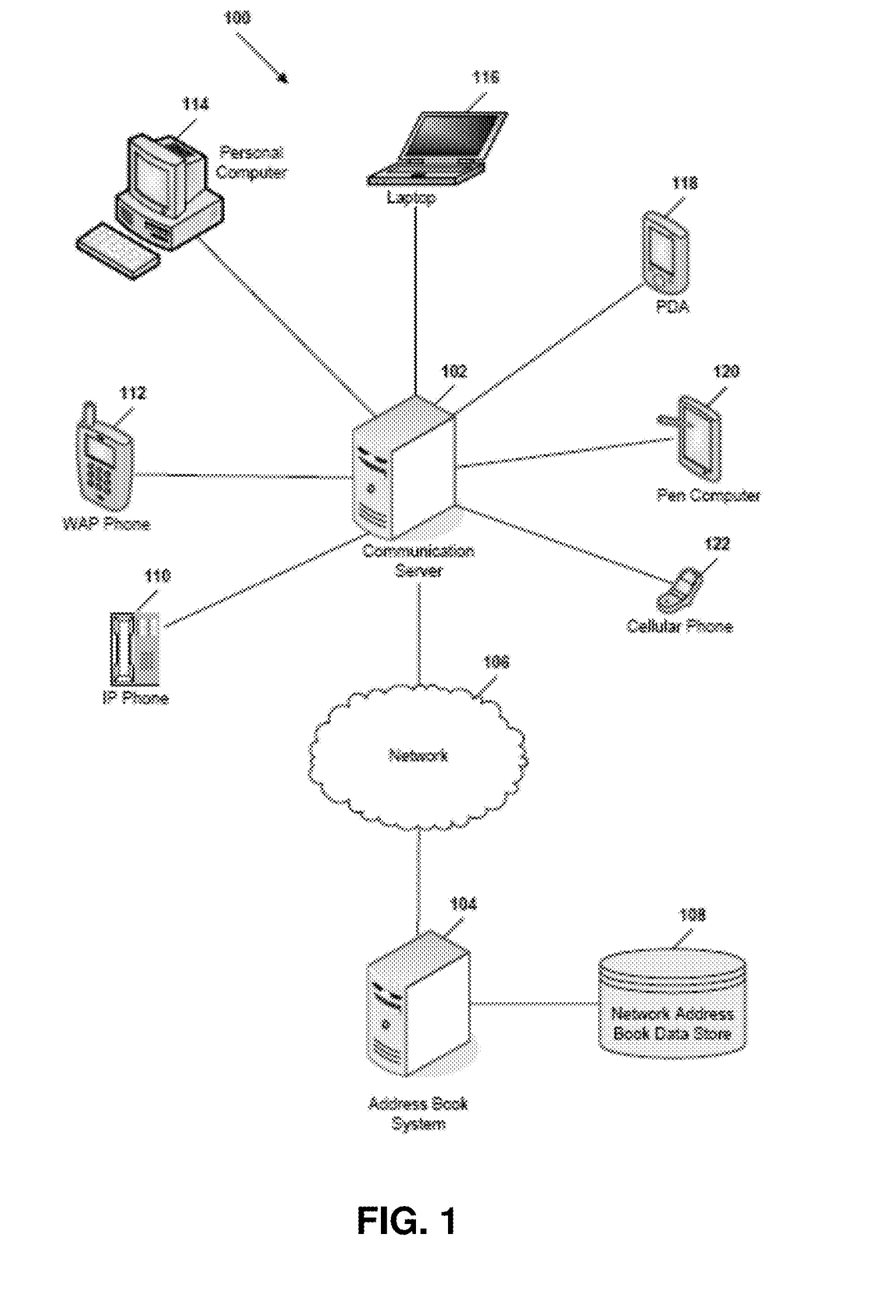
FIG. 1 depicts an exemplary embodiment of a communication system.

Referring to FIG. 1, an illustrative embodiment of a system to publish contact information is illustrated and is generally designated 100. As shown, the system 100 includes a communication server 102 that communicates with a plurality of electronic devices 110-122. For example, the communication server 102 can communicate with one or more Internet Protocol (IP) phones 110, one or more wireless access protocol (WAP) phones 112, one or more personal computers 114, one or more laptop computers 116, one or more personal data assistants (PDAs) 118, one or more stylus or pen-operated computers 120, one or more cellular phones 122, or any combination thereof. The electronic devices 110-122 can belong to a single user or to multiple users.

As illustrated in FIG. 1, the communication server 102 can communicate with an address book system 104 via a network 106. In a particular embodiment, the address book system 104 can store network address books associated with a plurality of users. In another embodiment, the address book system 104 can communicate with an external network address book data store 108 that stores the network address books.

Each network address book includes contact information for contacts of a user. In a particular embodiment, a network address book can include information and meta-information stored as entries in the network address book. An entry can correspond to a contact or communications partner, such as a person or organization, and can include contact information related to multiple devices or communications accounts used by the contact or communications partner. In an illustrative embodiment, contact information of each contact or communications partner can be organized in collections or groups.

Collections of contacts can be arranged and organized in any manner suitable to identify a subset of all contacts in a network address book. For example, a collection of contacts can include one or more physical addresses, phone numbers, e-mail addresses, other contact information, or any combination thereof, related to all contacts or communications partners whose names begin with a certain letter. In another example, a collection of contacts can include one or more physical addresses, phone numbers, e-mail addresses, other contact information, or any combination thereof, related to all contacts or communications partners belonging to a single organization. In another example, a collection of contacts can include one or more physical addresses, phone numbers, e-mail addresses, other contact information, or any combination thereof, related to all business contacts of a user.

In a particular embodiment, each electronic device 110-122 of a single user can be associated with the user's network address book at the address book system 104. A copy of the network address book can be stored at each of the electronic devices 110-122, and such copies can be synchronized among various electronic devices 110-122 associated with the user by synchronization rules executed at the address book system 104. Additionally, contact information within a user's network address book can be transcoded or otherwise converted between formats at the address book system 104, such that copies of the network address book can be presented at various electronic devices 110-122.

In another embodiment, a user can operate a copy or version of a network address book software application at each electronic device 110-122. In this embodiment, the network address book software application can convert contact information of the user's network address book into a format suitable to display the contact information at the particular electronic device on which the network address book software application is operated. Additionally, the network address book software application can convert contact information, commands, and other information input by the user at each electronic device 110-122 into a format suitable to be read, stored, or executed by the communication server 102, the address book system 104, the network address book data store 108, or any combination thereof.

In a particular embodiment, a user of a network address book stored by the network address book data store 108 can publish a collection of contacts included in the user's network address book to one or more recipients. The user can access a copy of his or her network address book at an electronic device 110-122 that communicates with the address book system 104 via the communication server 102 and the network 106. The user can select a collection of contacts from the network address book via the electronic device 110-122 and can issue a command to publish the collection of contacts.

The address book system 104 receives the command to publish the collection of contacts. In an illustrative embodiment, the address book system 104 can prompt the user to input a distribution list that includes recipients to whom the user desires to send the collection of contacts. The user can input or select the recipients via the electronic device 110-122 and send the distribution list to the address book system 104. In a particular embodiment, upon receiving the distribution list, the address book system 104 can send a notification to each recipient on the distribution list. The notification can include an invitation to subscribe to the collection of contacts.

The address book system 104 can receive subscribe or decline commands from the recipients and can send copies of the collection of contacts, such as read-only files containing data related to the collection of contacts, to one or more electronic devices 110-122 associated with each recipient that subscribes to the collection of contacts. In an illustrative embodiment, the address book system 104 can instruct the network address book data store 108 to associate the collection of contacts with a network address book corresponding to each user who subscribes to the collection of contacts.

In a particular embodiment, upon receiving the distribution list, the address book system 104 can determine whether each recipient on the distribution list is a customer or subscriber of a service associated with the network address books stored by the address book system 104 or the network address book data store 108. In this embodiment, the address book system 104 can prompt the user to input an e-mail address or other contact information for each non-customer or non-subscriber of the service.

The address book system 104 sends an automated message to each of the non-customer or non-subscriber recipients using the contact information that the address book system 104 receives from the user. The automated message includes an invitation to become a customer or subscriber of the service. In an illustrative embodiment, the address book system 104 can send a notification that includes an invitation to subscribe to the collection of contacts to the recipient after the recipient becomes a customer or subscriber of the service.

In an illustrative, non-limiting embodiment, a recipient who receives a notification that includes an invitation to subscribe to a collection of contacts can issue a command to the address book system 104 via the recipient's electronic device 110-122 indicating that the recipient desires to preview the collection of contacts before subscribing to or declining access to the collection of contacts. The address book system 104 can send contact information associated with one or more of the contacts in the collection of contacts to the recipient's electronic device 110-122 in response to receiving a selection to preview the collection of contacts designated in the invitation to the recipient.

Figure 2:
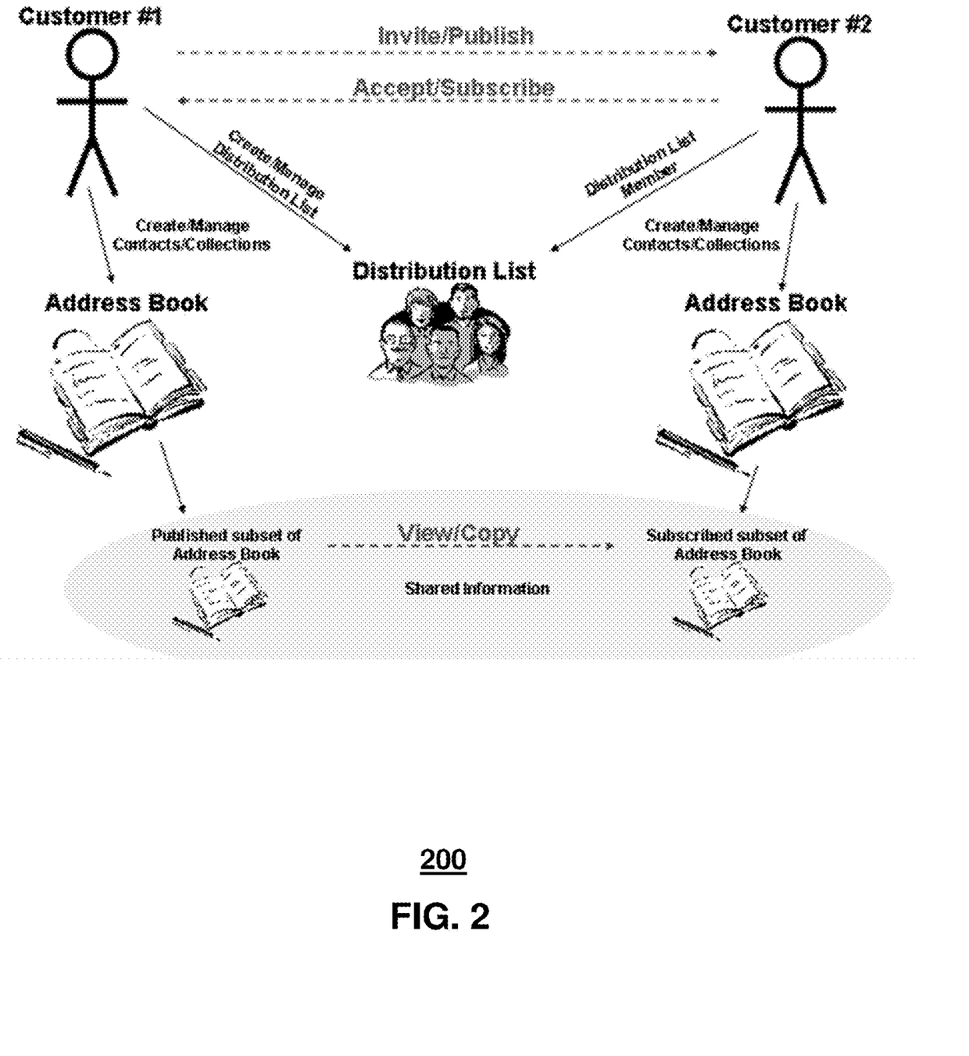
FIG. 2 depicts an exemplary illustration of a centrally managed address book system.
Figure 3:
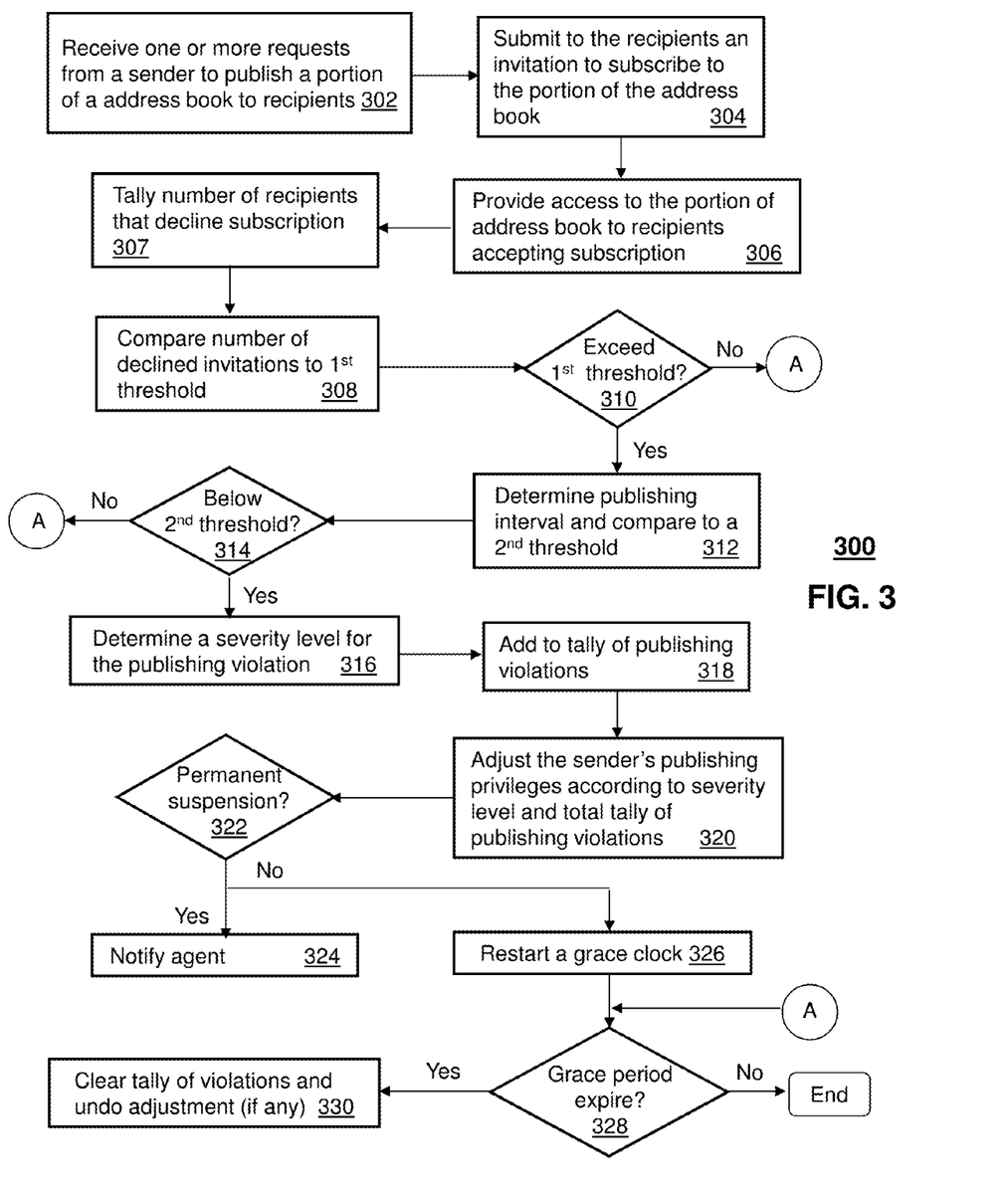
FIG. 3 depicts an exemplary method operating in portions of the communication system.
Figure 4:
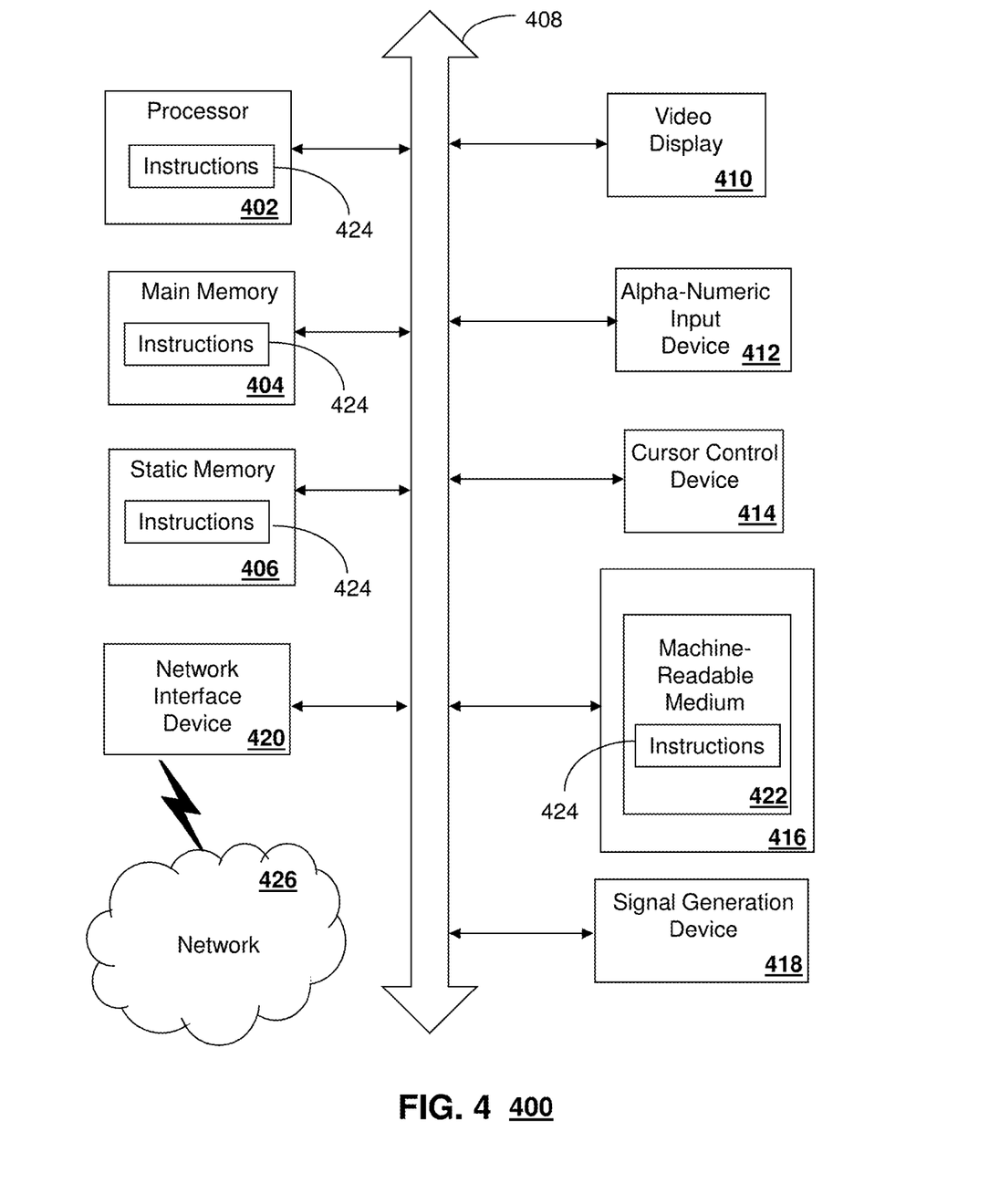
FIG. 4 depicts an exemplary diagrammatic representation of a machine in the form of a computer system within which a set of instructions, when executed, may cause the machine to perform any one or more of the methodologies disclosed herein.

FIG. 2 depicts an exemplary illustration of the aforementioned embodiments for publishing and subscribing to collections of contacts. FIG. 3 depicts an exemplary method 300 to manage spammers attempting to take advantage of the aforementioned contact management embodiments. Method 300 begins with step 302 in which the address book system (ABS) 104 receives one or more requests from a sender to publish to recipients a portion of the sender's address book. In step 304, the ABS 104 submits to the recipients an invitation to subscribe to the portion of the address book utilizing the publishing techniques described earlier for FIG. 1. In step 306, the ABS 104 provides access to the portion of the address book to recipients accepting the subscription, while in step 307 the ABS 104 tallies the number of recipients that decline the invitation to subscribe to the portion of the address book of the sender.

To determine if a potential spammer is misusing the ABS 104, a comparison is made by the ABS in step 308 of the number of declined invitations recorded in step 307 for the sender to a first threshold. The first threshold can be any number which a service provider of the ABS 104 can deem as a suspicious number of declined invitations. For example, publishing a portion of a contact book to five or more recipients at a time can raise suspicion. Five declined invitations can raise concern that the sender is not associated with the recipients. If ABS 104 detects that the number of declined invitations exceeds the first threshold, the ABS proceeds to step 312 where it determines a publishing interval for the publication requests and compares it to a second threshold.

For example, if the requests are spread throughout several days, it is unlikely that the sender is a spammer since most spammers perform broadcast requests. Thus, closely timed publication requests can serve as a second level of suspicious activity. Accordingly, the second threshold can be selected as a short span of time (e.g., 4 hours). If in step 314, the ABS 104 detects that the publishing interval is less than the second threshold, then a spamming event has likely occurred.

If neither the first or second thresholds have been violated, the ABS 104 proceeds to step 328 where it determines if a grace period for previous violations has expired. The grace period can be used to clear a historical tally of violations detected against the sender. Thus if the sender was previously identified as a violator, the grace period (e.g., 2 weeks) can be used to provide the sender an opportunity to remove in step 330 a tally of violations based on a desired behavioral profile monitored by the ABS 104.

If on the other hand the first and second thresholds have been violated, the ABS 104 proceeds to step 316 where it determines a severity level for the publishing violation detected by the ABS. The severity level can be determined from at least one among a first amount associated with a difference between the first threshold and the number of declined invitations, and a second amount associated with the difference between the second threshold and the publishing interval.

For example, if the first threshold is set to a limit of five declined invitations, and the number of actual declined invitations is 8, the first amount is an excess of 3 declined invitations over the first threshold. The higher the number, the more severe the violation. Similarly, if the second threshold is set to four hours and the requests are transmitted within one hour, then the second amount is 3 hours less than the second threshold. The closer in time the publication requests the more severe the violation. If the first and second amounts are nominal, the severity level can be set by the ABS 104 to a low state, while if the first and second amounts are high, the severity level can be set as high. The severity level can have any number of levels deemed suitable to managing publication privileges of subscribers of the ABS 104.

Once a severity level has been determined, the ABS 104 proceeds to step 318 where it tallies an aggregate of the presently detected publishing violation with previous violations. In step 320, the ABS 104 adjusts the sender's publishing privileges according to the severity level and total tally of publishing violations. The greater these two numbers are the more the privileges are reduced. For repeat offenders (e.g., high tally of violations, high severity level) the ABS 104 can suspend publishing privileges indefinitely. If such an event is detected in step 322, the ABS 104 proceeds to step 324 where a notification is sent to an agent of the ABS. The agent can be employed by the service provider of the ABS 104 to manage suspect spammers. The agent can contact the alleged spammer and explain why privileges have been revoked. Depending on responses given by the alleged spammer, the agent can temporarily restore services or maintain them revoked.

If the severity level and total violations are nominal and there are no previous violations (e.g., first time offender), the ABS 104 can be programmed to temporarily suspend services for a short period of time (e.g., 10 mins or 1 hour). If the severity level and the violations are greater than nominal but less than egregious, the ABS 104 can be programmed to suspend the sender for a period long enough to substantially reduce his/her activities (e.g., several days or a week).

Once the adjustment has been made to the sender's publishing privileges and the suspension is not indefinite, the ABS 104 proceeds to step 326 where it restarts the grace period clock. This step is helpful so that the tally of violation is cleared only when good faith activity of the sender is contiguous rather than sporadic. If the grace period has not expired in step 328, method 300 restarts from step 302.

From the foregoing descriptions, it would be evident to an artisan with ordinary skill in the art that the aforementioned embodiments can be modified, reduced, or enhanced without departing from the scope and spirit of the claims described below. For example, the communication server 102 and the ABS 104 can be combined into a single system or the communication server 102 can be a subsystem of the ABS 104. The ABS 104 can be supplemented to provide calendar publication and subscription services. In this instance, the method 300 can be used to monitor publications of a calendar portion to determine from declined invitations and a publication interval associated with the calendar publications whether a potential spammer has submitted the publication requests. Similarly, method 300 can be used to determine a severity level to be applied in adjusting the publication privileges of the sender in regards to publishing calendars and/or address books. With these enhancements the ABS 104 can be renamed more broadly as a content management system.

In yet another embodiment, method 300 can be modified to calculate ratios for the number of declined invitations detected. For example, the first threshold can represent a ratio of a number of acceptable declined invitations within a total number of invitations submitted (e.g., not more than 60% of the invitations are declined). Alternatively, the first threshold can represent a ratio of a number of acceptable declined invitations over a unit of time (e.g., not more than 10 declined invitations per hour).

The present disclosure can also be applied to an environment in which a sender has multiple accounts in the ABS 104 associated by a common service (e.g., cell phone, home number, email address, etc.). In this instance, method 200 can be adapted to aggregate declined invitations detected in at least a portion of content management accounts of the sender, compare the first threshold to the aggregated number of declined invitations detected, and adjusting the sender's publishing privileges in the multiple accounts of the sender responsive to the aggregated number of declined invitations detected exceeding the first threshold. As described above, the first threshold can also be adapted into unitless ratios (not more than 60% of declined invitations) or ratios based on a maximum number of declined invitations per unit of time. This latter embodiment can be used to prevent a spammer from readily rotating between accounts or scattering publications between accounts to avoid spam detection.

These are but a few examples of how the embodiments described herein can be updated without altering the scope of the claims below. Accordingly, the reader is directed to the claims for a fuller understanding of the breadth and scope of the present disclosure.

FIG. 3 depicts an exemplary diagrammatic representation of a machine in the form of a computer system 300 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 300 may include a processor 302 (e.g., a central processing unit (CPU), a graphics processing unit (GPU, or both), a main memory 304 and a static memory 306, which communicate with each other via a bus 308. The computer system 300 may further include a video display unit 310 (e.g., a liquid crystal display (LCD), a flat panel, a solid state display, or a cathode ray tube (CRT)). The computer system 300 may include an input device 312 (e.g., a keyboard), a cursor control device 314 (e.g., a mouse), a disk drive unit 316, a signal generation device 318 (e.g., a speaker or remote control) and a network interface device 320.

The disk drive unit 316 may include a machine-readable medium 322 on which is stored one or more sets of instructions (e.g., software 324) embodying any one or more of the methodologies or functions described herein, including those methods illustrated above. The instructions 324 may also reside, completely or at least partially, within the main memory 304, the static memory 306, and/or within the processor 302 during execution thereof by the computer system 300. The main memory 304 and the processor 302 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 324, or that which receives and executes instructions 324 from a propagated signal so that a device connected to a network environment 326 can send or receive voice, video or data, and to communicate over the network 326 using the instructions 324. The instructions 324 may further be transmitted or received over a network 326 via the network interface device 320.

While the machine-readable medium 322 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A non-transitory computer-readable storage medium, comprising computer instructions which, responsive to being executed by a processor of an address book system, cause the processor to perform operations comprising:
storing a network address book of a sender;

receiving, from a sender device associated with the sender, a request to publish to a plurality of recipient devices a first portion of the network address book of the sender;

submitting to the plurality of recipient devices an invitation to subscribe to the first portion of the network address book;

transmitting the first portion of the network address book to a first portion of the plurality of recipient devices responsive to receiving accepted invitations to subscribe to the first portion of the network address book;

comparing a first threshold to a number of declined invitations to subscribe to the first portion of the network address book received from a second portion of the plurality of recipient devices;

determining whether the number of declined invitations exceeds the first threshold;

determining a number of publishing violations recorded for the sender;

determining a length of a suspension period according to the number of publishing violations recorded, the number of declined invitations, and a length of a request interval between a request for publication of the sender and a subsequent request for publication of the sender;

adjusting an ability of the sender to publish a second portion of the network address book responsive to a determination that the number of declined invitations exceeds the first threshold, wherein the adjusting of the ability to publish comprises suspending the ability of the sender to publish the second portion of the network address book for the length of the suspension period and reinstating the ability of the sender to publish the second portion of the network address book after the suspension period has expired;

detecting a time the request was submitted;

recording the number of publishing violations associated with the sender;

determining other accounts associated with the sender; and suspending an ability of the sender to publish the network address book utilizing the other accounts for the suspension period.

2. The non-transitory computer-readable storage medium of claim 1, comprising computer instructions for comparing a second threshold to a request interval between the time the request was submitted and a subsequent time a second request was submitted by the sender.

3. The non-transitory computer-readable storage medium of claim 2, wherein the adjusting of the ability of the sender to publish the second portion of the network address book is responsive to a determination that the request interval is below the second threshold.

4. The non-transitory computer-readable storage medium of claim 3, comprising computer instructions for determining a severity level according to the number of declined invitations, the number of publishing violations recorded for the sender, and a length of the request interval, wherein the severity level is utilized for determining the suspension period.

5. The non-transitory computer-readable storage medium of claim 4, comprising computer instructions for determining the severity level from at least one among a first amount associated with a difference between the first threshold and the number of declined invitations, and a second amount associated with the difference between the second threshold and the request interval.

6. The non-transitory computer-readable storage medium of claim 3, comprising computer instructions for:

aggregating previous violations of the first and second thresholds with a violation associated with the adjusting the ability of the sender to publish the second portion of the network address book.

7. The non-transitory computer-readable storage medium of claim 6, comprising computer instructions for recording a tally of violations associated with the aggregating.

8. The non-transitory computer-readable storage medium of claim 7, comprising computer instructions for clearing the tally of violations responsive to a contiguous grace period in which publications originated by the sender do not violate at least one among the first and second thresholds, wherein the clearing of the tally of violations is according to monitoring of a desired behavioral profile for the sender.

9. The non-transitory computer-readable storage medium of claim 1, wherein the suspension period is indefinite when the number of publishing violations exceeds a third threshold.

10. The non-transitory computer-readable storage medium of claim 9, wherein the storage medium comprises computer instructions for submitting a notice that indicates an indefinite suspension has been applied to the sender.

11. The non-transitory computer-readable storage medium of claim 1, wherein the operations further comprise synchronizing the network address book with local address books stored at end user devices of the sender that include the sender device, wherein the processor comprises a plurality of processors operating in a distributed processing environment.

12. An address book system comprising:

a memory that stores instructions; and a controller element which, responsive to executing the instructions, performs operations comprising:

receiving, from a sender device associated with a sender, a request to publish to a plurality of recipient devices a first portion of a network address book of the sender;

submitting, to the plurality of recipient devices, an invitation to subscribe to the first portion of the network address book;

transmitting the first portion of the network address book to a first portion of the plurality of recipient devices responsive to receiving accepted invitations to subscribe to the first portion of the network address book;

comparing a first threshold to a number of declined invitations to subscribe to the first portion of the network address book received from a second portion of the plurality of recipient devices;

determining whether the number of declined invitations exceeds the first threshold;

determining a number of publishing violations recorded for the sender;

determining a length of a suspension period according to the number of publishing violations recorded, the number of declined invitations, and a length of a request interval between a request for publication of the sender and a subsequent request for publication of the sender;

adjusting an ability of the sender to publish a second portion of the network address book responsive to a determination that the number of declined invitations exceeds the first threshold, wherein the adjusting of the ability to publish comprises suspending the ability of the sender to publish the second portion of the network address book for the length of the suspension period and reinstating the ability of the sender to publish the second portion of the network address book after the suspension period has expired;

determining other accounts associated with the sender;

suspending an ability of the sender to publish the network address book utilizing the other accounts for the suspension period; and synchronizing the network address book with local address books stored at end user devices of the sender that include the sender device.

13. The address book system of claim 12, wherein the operations further comprise determining a severity level according to the number of declined invitations, a number of publishing violations recorded for the sender, and a length of a request interval between the request and a subsequent request of the sender, and wherein the controller element comprises a plurality of controller elements operating in a distributed processing environment.

14. The address book system of claim 13, wherein the operations further comprise comparing a second threshold to the request interval between the request and the subsequent request of the sender, wherein the adjusting of the ability of the sender to publish the second portion of the network address book is responsive to a determination that the request interval is below the second threshold.

15. The address book system of claim 12, wherein the suspension period is indefinite when the number of publishing violations exceeds a third threshold.

16. A method, comprising:
receiving, by a system comprising a processor, a request from a sender device associated with a sender to publish to a plurality of recipient devices a first portion of a network address book of the sender;
submitting, by the system, to the plurality of recipient devices, an invitation to subscribe to the first portion of the network address book;
transmitting, by the system, the first portion of the network address book to a first portion of the plurality of recipient devices responsive to receiving accepted invitations to subscribe to the first portion of the network address book;
comparing, by the system, a first threshold to a number of declined invitations to subscribe to the first portion of the network address book received from a second portion of the plurality of recipient devices;
determining, by the system, whether the number of declined invitations exceeds the first threshold;
determining, by the system, a number of publishing violations recorded for the sender;
modifying, by the system, publication privileges of the sender responsive to the number of declined invitations exceeding the first threshold, wherein the modifying of the publication privileges comprises temporarily suspending the publication privileges of the sender to publish the second portion of the network address book for a suspension period having a length determined according to the number of declined invitations, the number of publishing violations recorded for the sender, and a length of a request interval between a request for publication of the sender and a subsequent request for publication of the sender,
wherein a portion of content supplied by the sender comprises at least one among a first portion of an address book of the sender, and a second portion of calendar information of the sender; and
synchronizing, by the system, the content with local content at end user devices of the sender.

17. The method of claim 16, comprising:
determining other accounts associated with the sender;
suspending an ability of the sender to publish the content utilizing the other accounts for the suspension period; and
reinstating the publication privileges after the suspension period.

18. The method of claim 16, comprising:
generating one among a first ratio of the number of declined invitations received from the recipients to a total number of invitations submitted to the recipients, and a second ratio of the number of declined invitations to a unit of time;
comparing the threshold to one among the first and second ratios; and
adjusting the publication privileges of the sender responsive to one among the first and second ratios exceeding the threshold.

19. The method of claim 16, wherein the sender is subscribed to a plurality of content management accounts, and wherein the method further comprises:
aggregating declined invitations detected in at least a portion of the plurality of content management accounts;
comparing the threshold to an aggregated number of declined invitations detected; and
adjusting the publication privileges of the sender in the plurality of content management accounts responsive to the aggregated number of declined invitations detected exceeding a second threshold,
wherein the processor comprises a plurality of processors operating in a distributed processing environment.

* * * * *